United States Patent
Windsheimer et al.

(10) Patent No.: US 11,772,253 B2
(45) Date of Patent: Oct. 3, 2023

(54) PORTABLE POWER TOOL HAVING A SHIFTABLE TRANSMISSION

(71) Applicant: Robert Bosch GmbH, Stuttgart (DE)

(72) Inventors: Ralf Windsheimer, Stuttgart (DE); Suresh Subramaniam, Stuttgart-Weilimdorf (DE); Thomas Hampel, Magstadt (DE)

(73) Assignee: Robert Bosch GmbH, Stuttgart (DE)

( * ) Notice: Subject to any disclaimer, the term of this patent is extended or adjusted under 35 U.S.C. 154(b) by 65 days.

(21) Appl. No.: 17/446,037

(22) Filed: Aug. 26, 2021

(65) Prior Publication Data

US 2022/0063079 A1  Mar. 3, 2022

(30) Foreign Application Priority Data

Aug. 27, 2020 (DE) ...................... 10 2020 210 824.2

(51) Int. Cl.
*B25F 5/00* (2006.01)
*F16D 11/10* (2006.01)
*F16D 11/00* (2006.01)

(52) U.S. Cl.
CPC .............. *B25F 5/001* (2013.01); *F16D 11/10* (2013.01); *F16D 2011/002* (2013.01); *F16D 2300/26* (2013.01)

(58) Field of Classification Search
CPC ................................. F16D 11/10; B25F 5/001
See application file for complete search history.

(56) References Cited

U.S. PATENT DOCUMENTS

2018/0370011 A1* 12/2018 Bantle .................... B25F 5/001

FOREIGN PATENT DOCUMENTS

| DE | 10 2012 219 495 A1 | 4/2014 |
|---|---|---|
| DE | 10 2014 224 931 A1 | 6/2016 |
| DE | 10 2015 203 575 A1 | 9/2016 |
| DE | 10 2015 226 089 A1 | 6/2017 |
| DE | 10 2017 222 006 A1 | 6/2019 |

* cited by examiner

*Primary Examiner* — Daniel Jeremy Leeds
(74) *Attorney, Agent, or Firm* — Maginot, Moore & Beck LLP

(57) ABSTRACT

A portable power tool has a drive unit for rotationally driving a tool receptacle about an axis of rotation, the drive unit having at least one drive motor and a shiftable transmission, which is arranged in a transmission housing with an at least partially sleeve-like clutch housing and a transmission cover fastened thereto. The tool includes a shifting element for shifting the shiftable transmission between at least two different gears, and a locking sleeve for locking the shifting element in at least a first and a second shifting position is arranged in the clutch housing. The shiftable transmission forms, at least in the first shifting position, a cross-sectional plane perpendicular to the axis of rotation in which the locking sleeve is arranged at least regionally between the transmission cover and the shifting element and the shifting element is arranged at least regionally between the locking sleeve and the clutch housing.

16 Claims, 16 Drawing Sheets

PORTABLE POWER TOOL HAVING A SHIFTABLE TRANSMISSION

This application claims priority under 35 U.S.C. § 119 to application no. DE 10 2020 210 824.2, filed on Aug. 27, 2020 in Germany, the disclosure of which is incorporated herein by reference in its entirety.

BACKGROUND

The present disclosure relates to a portable power tool having a drive unit for driving a tool receptacle in rotation about an associated axis of rotation, wherein the drive unit has at least one drive motor and a shiftable transmission, wherein the shiftable transmission is arranged in a transmission housing with an at least partially sleeve-like clutch housing and a transmission cover fastened thereto, wherein a shifting element for shifting the shiftable transmission between at least two different gears is provided, and wherein a locking sleeve for locking the shifting element in at least a first and a second shifting position is arranged in the clutch housing.

A power tool of this kind having a drive unit is known from the prior art. The drive unit has a drive motor and a shiftable transmission. The shiftable transmission is arranged in a transmission housing, and an associated shifting ring gear for shifting gears is able to be acted on via a shifting element. In that case, the shifting element is arranged on the outer circumference of the transmission housing.

SUMMARY

The disclosure relates to a portable power tool having a drive unit for driving a tool receptacle in rotation about an associated axis of rotation, wherein the drive unit has at least one drive motor and a shiftable transmission, wherein the shiftable transmission is arranged in a transmission housing with an at least partially sleeve-like clutch housing and a transmission cover fastened thereto, wherein a shifting element for shifting the shiftable transmission between at least two different gears is provided, and wherein a locking sleeve for locking the shifting element in at least a first and a second shifting position is arranged in the clutch housing. The shiftable transmission forms, at least in the first shifting position of the shifting element perpendicular to the axis of rotation, a cross-sectional plane in which the locking sleeve is arranged at least regionally between the transmission cover and the shifting element and the shifting element is arranged at least regionally between the locking sleeve and the clutch housing.

The disclosure thus allows the provision of a portable power tool that can be equipped with a compact transmission as a result of the specified arrangement in the cross-sectional plane.

Preferably, the shiftable transmission has a shifting ring gear that is displaceable axially by the shifting element and is arranged in an inner receptacle formed by the locking sleeve, wherein the shifting ring gear has on its outer circumference a receiving groove for at least partially receiving the shifting element.

Thus, an at least partial arrangement of the shifting element on the shifting ring gear for shifting gears can be allowed in a secure and uncomplicated manner.

Preferably, the transmission cover has an annular centering collar, arranged in the inner receptacle of the locking sleeve, for centering the locking sleeve in a radial direction.

Thus, centering of the locking sleeve can be allowed in a simple manner.

The transmission cover engages preferably in a form-fitting manner in the locking sleeve.

Thus, a secure and reliable arrangement of the transmission cover on the locking sleeve can be allowed.

According to one embodiment, the locking sleeve has, at its axial end facing the transmission cover, at least one axially oriented positioning tab, wherein the transmission cover has a receptacle for receiving the at least one axially oriented positioning tab.

Thus, a secure and reliable positioning aid can be provided and prepositioning of the transmission cover during the assembly of the shiftable transmission can be allowed.

Preferably, the locking sleeve has, at its axial end facing the transmission cover, at least one supporting peg that is supported on a screw lug of the transmission cover.

Thus, stable and robust support of the transmission cover can be allowed. Furthermore, the at least one supporting peg can allow a positioning aid and prepositioning of the transmission cover during the assembly of the shiftable transmission.

Preferably, at the axial end, facing the transmission cover, of the locking sleeve at least two supporting pegs are arranged, wherein the positioning tab and the supporting pegs preferably form a triangular arrangement.

Thus, a compact and reliable arrangement of the transmission cover on the locking sleeve can be allowed.

Preferably, the transmission cover is fastened to the clutch housing by at least one screw element, wherein the at least one screw element urges the transmission cover in the direction of the tool receptacle. Furthermore, the transmission cover is preferably fastened on a side of the clutch housing that faces the drive motor.

According to one embodiment, the transmission cover forms, on its side facing the tool receptacle, a ring gear of the shiftable transmission.

Thus, a compact shiftable transmission having a reduced overall length can be provided.

Preferably, the locking sleeve has, on its outer circumference, deflecting webs, formed in a diametrically opposite manner, for deflecting the shifting element when shifting from a first gear into a second. Furthermore, the locking sleeve preferably has associated recesses for the shifting element to pass through. Moreover, the clutch housing and the locking sleeve are preferably connected together via a form-fitting connection.

According to one embodiment, the clutch housing has, on its inner circumference, at least one inwardly directed protrusion and the locking sleeve has, on its outer circumference, at least one receptacle, wherein the at least one protrusion is arranged in the at least one receptacle.

Thus, rotation prevention and/or torque support between the clutch housing and the locking sleeve can be formed in a simple manner.

Preferably, the at least one protrusion is arranged parallel to the axis of rotation.

Thus, a simple and uncomplicated arrangement of the protrusion can be allowed.

According to one embodiment, a plurality of protrusions are configured as one-step protrusions with a single step and/or as two-step protrusions with a first step and a second step, wherein the second step has a greater height in the radial direction than the first step.

Thus, suitable protrusions can be provided in a simple manner.

Preferably, the locking sleeve has receptacles, assigned to the protrusions, for preventing the locking sleeve from rotating and centering it on the clutch housing.

Thus, a secure and reliable connection between the locking sleeve and the clutch housing can be provided.

According to one embodiment, a fixing ring is arranged at the axial end, facing the tool receptacle, of the locking sleeve, wherein the fixing ring prevents the shifting ring gear from rotating when the shifting element is arranged in the first shifting position.

Thus, safe and reliable operation of the shiftable transmission can be allowed, in which the shifting ring gear is prevented from rotating in the first shifting position.

Preferably, the fixing ring exhibits metal. Preferably, the shifting ring gear has, on its outer circumference, an external toothing and the fixing ring has, on its inner circumference, an internal toothing, wherein the external toothing of the shifting ring gear forms a form fit with the internal toothing of the fixing ring.

According to one embodiment, the locking sleeve has annular extensions and the fixing ring is arranged on the locking sleeve such that the annular extensions receive the fixing ring circumferentially.

Thus, a secure and reliable arrangement of the fixing ring can be allowed, wherein rotation prevention and/or torque support of the fixing ring can be formed.

Preferably, the annular extensions are arranged at an axial end, facing the tool receptacle, of the locking sleeve. In this case, a receptacle is preferably formed in each case between two adjacent annular extensions.

Preferably, the shiftable transmission is a planetary transmission with at least one ring gear, at least one planet carrier and at least one planet gear, wherein a disk-like plate is arranged between the at least one planet carrier and the at least one planet gear, said plate preventing the planet carrier from moving into the ring gear in the first shifting position of the shifting element. Preferably, the disk-like plate is supported axially on the clutch housing. In this case, the disk-like plate is preferably arranged at an axial end, facing the tool receptacle, of the fixing ring. In this case, the disk-like plate and the fixing ring preferably each has recesses on their outer circumference, wherein the recesses are configured to receive protrusions of the clutch housing. Furthermore, the fixing ring preferably has tabs on its outer circumference, wherein a first or a second receptacle is formed between two adjacent tabs, and wherein the first receptacle is configured to receive the protrusions and the second receptacle is configured to receive the annular extensions of the locking sleeve. Preferably, the clutch housing has, on its inner circumference, at least partially in the circumferential direction, a contact edge for supporting the disk-like plate.

According to one embodiment, the clutch housing has a recess which is formed along the axis of rotation of the tool receptacle and via which the shifting element is connected to an operator-control element for actuating the shifting element.

Thus, secure and reliable operation of the shiftable transmission can be allowed.

Preferably, the shifting element has an arcuate, preferably at least approximately U-shaped, main body. Furthermore, the locking sleeve preferably exhibits plastic.

BRIEF DESCRIPTION OF THE DRAWINGS

The disclosure is explained in more detail in the following description with reference to exemplary embodiments illustrated in the drawings, in which.

DETAILED DESCRIPTION

In the figures, elements having the same or a comparable function are provided with identical reference signs and described in detail only once.

Figure 1:
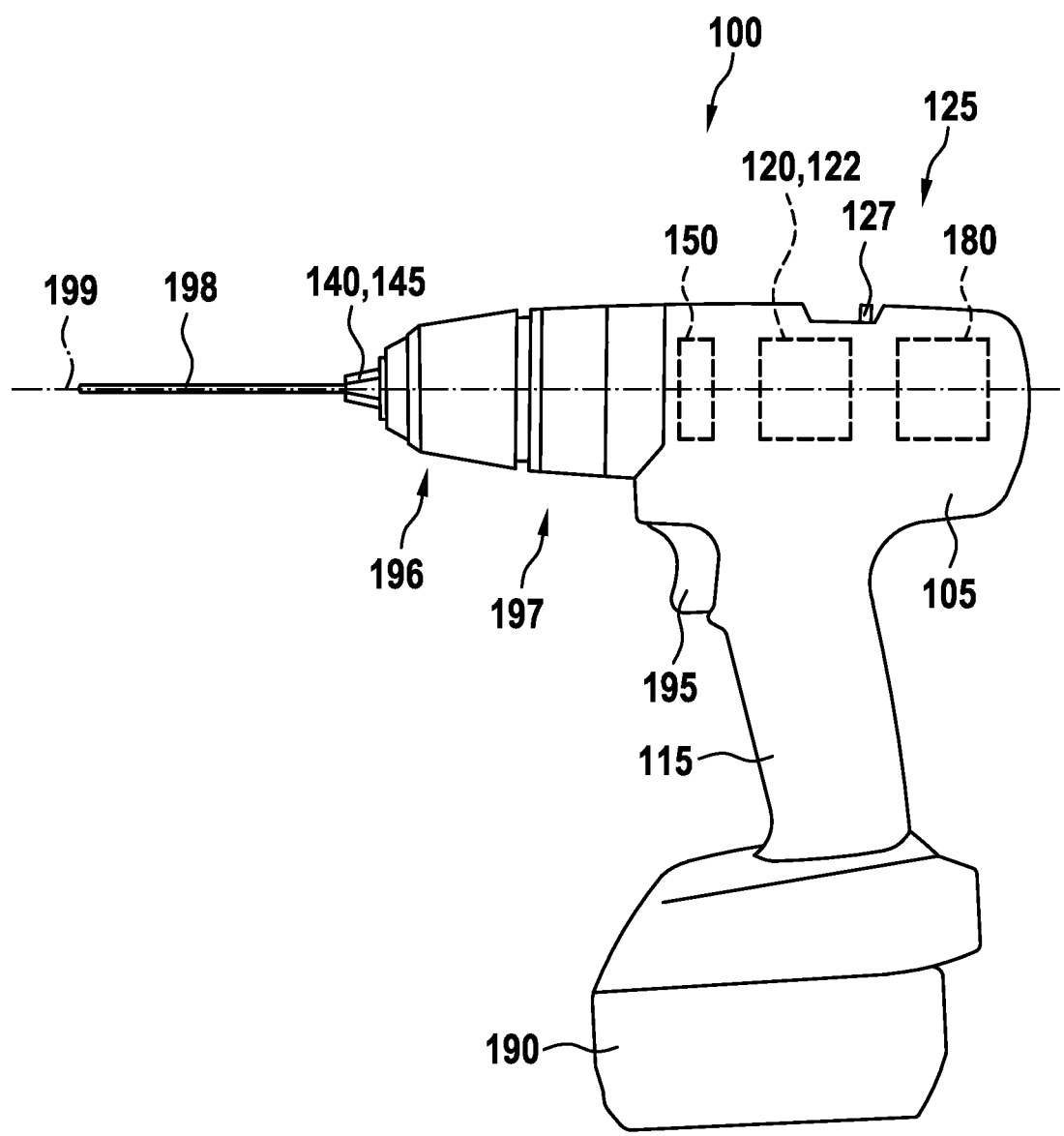
FIG. 1 shows a side view of a portable power tool having a shiftable transmission arranged in a transmission housing.

FIG. 1 shows an example of a portable power tool 100 having a housing 105, in which preferably a drive unit 125 for driving a tool receptable 140 in rotation is arranged. As illustrated, the tool receptacle 140 is configured to receive an application tool 198 and rotates in operation about an axis of rotation 199.

As illustrated, the portable power tool 100 is able to be connected mechanically and electrically to a battery pack 190 to be supplied with power independently of the grid, but, alternatively, can also be operable for example using grid power. For example, the portable power tool 100 is in the form of a drill driver. Accordingly, in the illustration, the tool receptacle 140 is in the form of a chuck 145, which is provided for example with a protective sleeve 196. Alternatively, however, the tool receptacle 140 can also be provided in the manner of a tool attachment, which is arranged releasably on the portable power tool 100.

It is also possible, however, for the portable power tool 100 to be in the form, for example, of a hammer drill or impact drill driver. In this case, the portable power tool 100 has an associated impact mechanism 150, which is not required when it is in the form of a drill driver. It should be noted, however, that the present disclosure is not limited to drill drivers, hammer drills or impact drill drivers, but can be used generally in portable power tools of which the drive unit has a shiftable transmission, in particular a planetary transmission.

In the exemplary embodiment illustrated, the drive unit 125 has, in the illustration, at least a drive motor 180 and a shiftable transmission 120. Preferably, the drive motor 180 is in the form of an electronically commutated motor. Preferably, the drive motor 180 is able to be switched on and off via a manual switch 195, wherein the manual switch 195 is arranged in the illustration on a handle 115 of the housing 105.

The shiftable transmission 120 is preferably in the form of a planetary transmission. Preferably, the shiftable transmission 120 is arranged in a transmission housing 122. Preferably, the shiftable transmission 120 is assigned a shifting element (240 in FIG. 2) for shifting between at least two different gears (1598, 1599 in FIG. 16), in which the shifting element (240 in FIG. 2) is arranged in corresponding shifting positions (205, 206 in FIG. 2) assigned to the gears (1598, 1599 in FIG. 16). Preferably, the shiftable transmission 120 has an operator control element 127 for actuating the shifting element (240 in FIG. 2) or for a user to shift gears manually. The shiftable transmission 120 is referred to merely as the "transmission 120" in the following text for the sake of simplicity.

Furthermore, the portable power tool 100 optionally has a torque setting device having a torque setting sleeve 197. Such a torque setting device is well known from the prior art and so a detailed description of the torque setting device will not be given here in order to keep the description concise.

Figure 2:
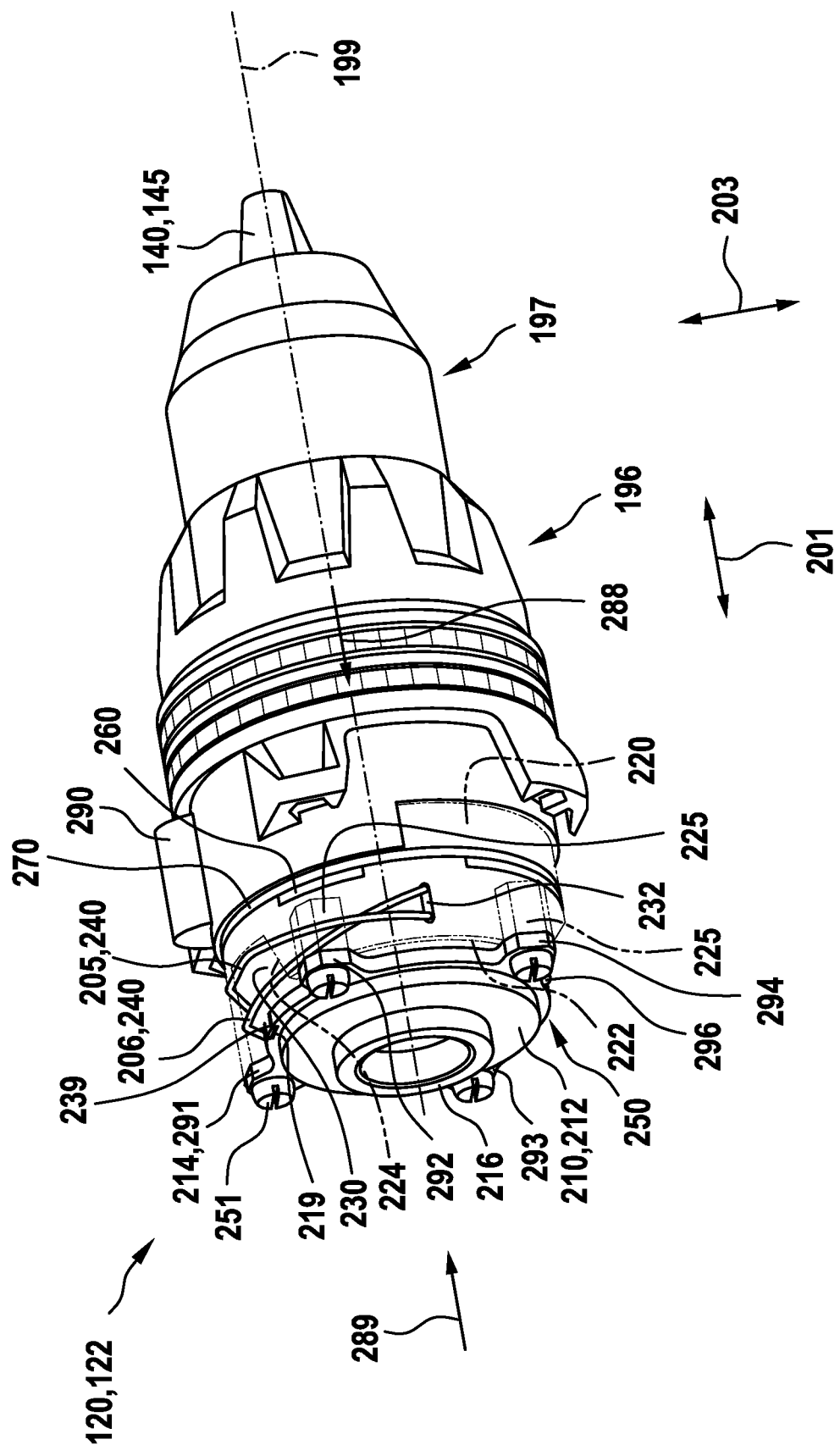
FIG. 2 shows a perspective view of the shiftable transmission from FIG. 1 arranged in the transmission housing from FIG. 1.

FIG. 2 shows the transmission 120 arranged in the transmission housing 122 with the chuck 145 from FIG. 1. Furthermore, FIG. 2 indicates an operating mode setting element 290. In the illustration, the operating mode setting element 290 is in the form of a sleeve.

The transmission housing 122 preferably has an at least partially sleeve-like clutch housing 220 and a transmission cover 210 fastened thereto. Furthermore, a locking sleeve 230 for locking a shifting element 240 is preferably arranged in the clutch housing 220.

In the illustration, the clutch housing 220 is depicted in a transparent manner in order to clarify the illustration. In this case, the locking sleeve 230 is preferably arranged on an inner circumference 222 of the clutch housing 220. Preferably, the locking sleeve 230 is fixed to the clutch housing 220. Preferably, the clutch housing 220 and the locking sleeve 230 are connected together via a form-fitting connection. Furthermore, the transmission cover 210 preferably engages in a form-fitting manner in the locking sleeve 230.

Preferably, the transmission cover 210 is arranged at an end of the transmission housing 122 that faces away from the tool receptacle 140. In the illustration, the transmission cover 210 has a disk-like main body with a central bearing flange 216, and a side 289 facing the drive motor 180 and a side 288 facing the tool receptacle 140. On its outer circumference, the transmission cover 210 preferably has at least two, in the illustration four connecting portions 214. In this case, the four connecting portions 214 at least approximately form a rectangle. Preferably, screw lugs 291, 292, 293, 294 are assigned to the connecting portions 214.

According to one embodiment, the transmission cover 210 is fastened to a side of the clutch housing 220 that faces the drive motor 180. Preferably, the transmission cover 210 is fastened to the clutch housing 220 via a screw connection 250 with at least one screw element 251. The transmission cover 210 is fastened in the illustration to the clutch housing 220 via four screw lugs 291, 292, 293, 294 by means of four associated screw elements 251. In this case, the screw elements 251 urge the transmission cover 210 in the direction of the tool receptacle 140, preferably in the axial direction 201 toward the tool receptacle 140.

Preferably, the clutch housing 220 has connecting regions 225 assigned to the connecting portions 214. Preferably, the connecting regions 225 each have a threaded region for arranging the screw elements 251. Preferably, each connecting portion 214 or connecting region 225 is assigned a respective screw element 251 for forming the corresponding screw connection 250.

Furthermore, the transmission cover 210 preferably forms, on its side 288 facing the tool receptacle 140, a ring gear 212 of the transmission 120. Preferably, the ring gear 212 is formed in one piece with the transmission cover 210. However, the ring gear 212 can also be fixed permanently or releasably to the transmission cover 210 by any desired connection.

Figure 16:
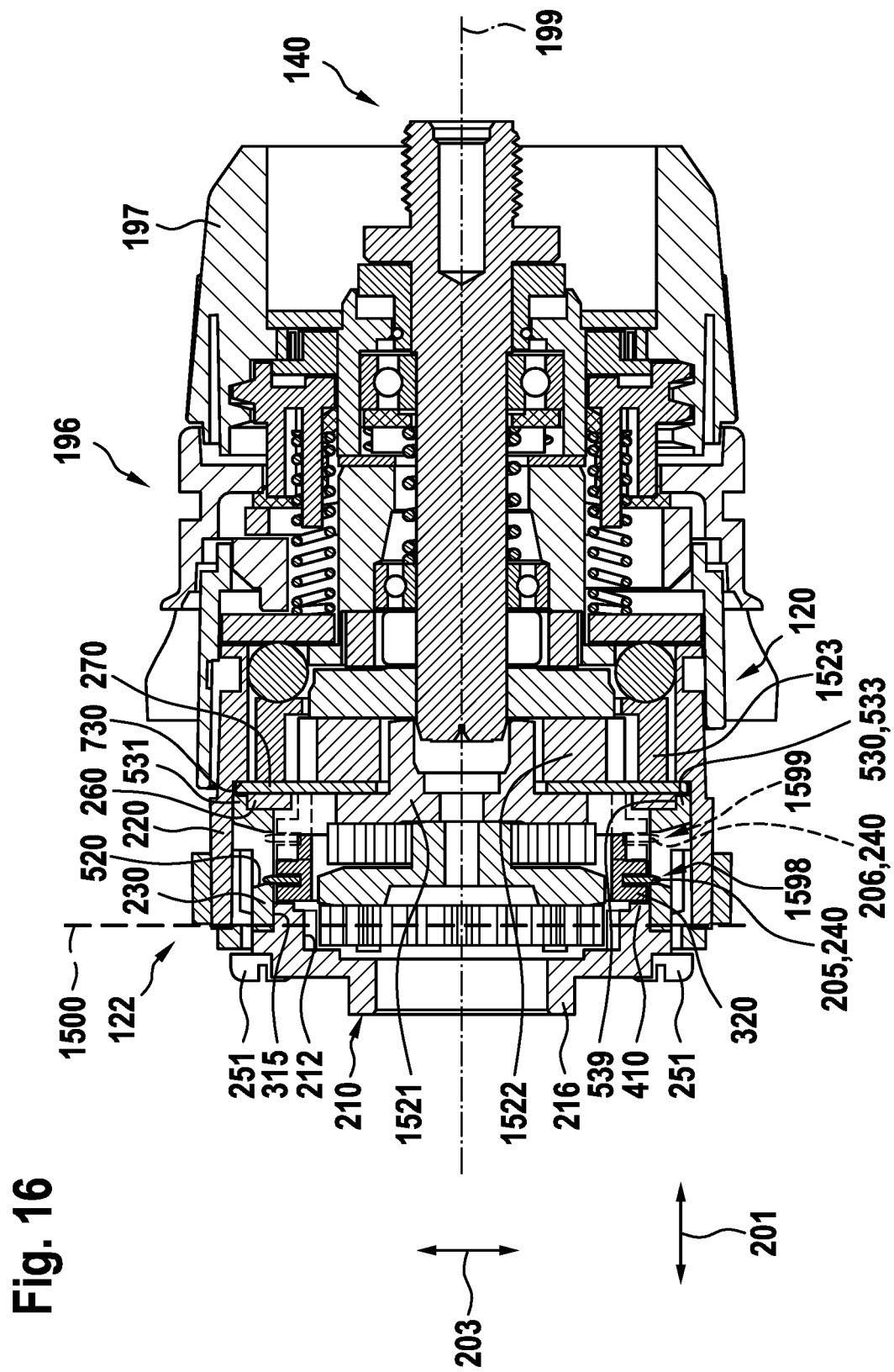
FIG. 16 shows a longitudinal section through the shiftable transmission from FIG. 1 to FIG. 6.

Preferably, the transmission 120 is assigned a shifting element 240 for shifting between at least two different gears (1598, 1599 in FIG. 16). The shifting element 240 is in this case able to be arranged in shifting positions 205, 206 assigned to the gears (1598, 1599 in FIG. 16). Preferably, in this case, the shifting element 240 is able to be arranged in an illustrated right-hand shifting position 205 and in an illustrated left-hand shifting position 206. In the right-hand shifting position 205, a shifting ring gear (320 in FIG. 3) assigned to the shifting element 240 is arranged in an illustrated left-hand position, or in a first gear (1598 in FIG. 16) and in the left-hand shifting position 206, the shifting ring gear (320 in FIG. 3) is arranged in an illustrated right-hand position, or in a further gear (1599 in FIG. 16). Preferably, the transmission 120 forms, at least in the right-hand shifting position 205 of the shifting element 240 perpendicular to the axis of rotation 199, a cross-sectional plane (1500 in FIG. 16) in which the locking sleeve 230 is arranged at least regionally between the transmission cover 210 and the shifting element 240 and the shifting element 240 is arranged at least regionally between the locking sleeve 230 and the clutch housing 220.

Figure 11:
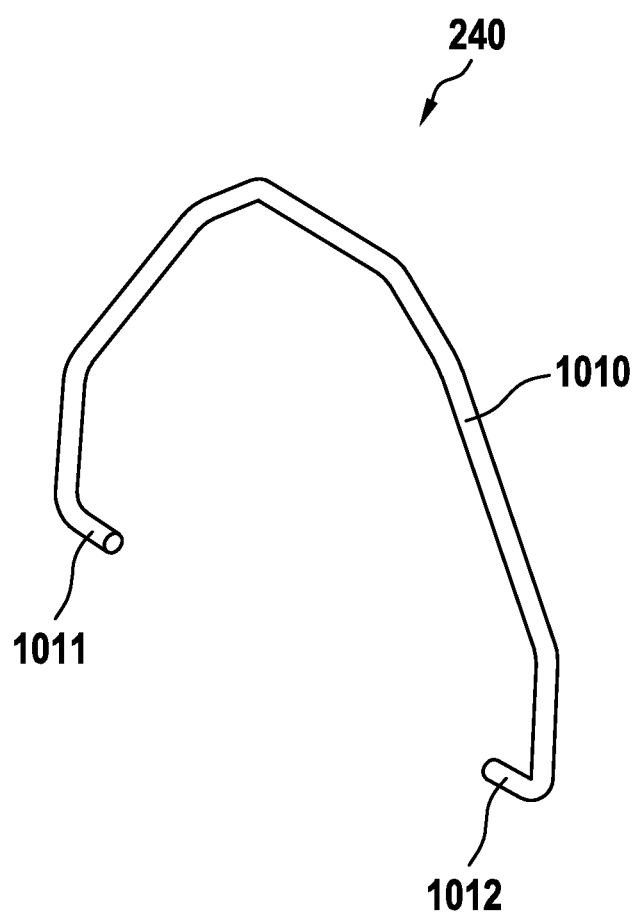
FIG. 11 shows a perspective view of a shifting element assigned to the shiftable transmission from FIG. 1 to FIG. 6.

According to one embodiment, the shifting element 240 has an arcuate, preferably at least approximately U-shaped main body (1010 in FIG. 11). The shifting element 240 is preferably arranged at least partially between the clutch housing 220 and the locking sleeve 230. In this case, the shifting element 240 is preferably configured, for shifting the transmission 120, to urge the shifting ring gear (320 in FIG. 3) along the axis of rotation 199 of the tool receptacle 140 for shifting gears.

Preferably, the locking sleeve 230 has associated recesses 232 for the shifting element 240 to pass through. Preferably, the clutch housing 220 has a recess 224 which is formed along the axis of rotation 199 of the tool receptacle 140 and via which the shifting element 240 is able to be connected to the operator control element 127 from FIG. 1 for actuating the shifting element 240.

According to one embodiment, the locking sleeve 230 has, at its end (801 in FIG. 9) facing the transmission cover 210, at least one axially oriented positioning tab 239, wherein the transmission cover 210 has a receptacle 219 for receiving the at least one axially oriented positioning tab 239. The expression "axially oriented", in the context of the present disclosure, means an orientation in the axial direction 201 or along the axis of rotation 199.

Furthermore, the locking sleeve 230 preferably has, at its axial end (801 in FIG. 9) facing the transmission cover 210, at least one supporting peg 296, which is supported on a screw lug 293, 294 of the transmission cover 210. Preferably, at least two supporting pegs 296 are arranged at the axial end (801 in FIG. 9), facing the transmission cover 210, of the locking sleeve 230, wherein the positioning tab 239 and the supporting pegs 296 preferably form a triangular arrangement. It should be noted, however, that the arrangement can also have any other desired shape, for example a rectangular shape.

Furthermore, a fixing ring 260 is arranged at the axial end (802 in FIG. 9), facing the tool receptacle 140, of the locking sleeve 230. Preferably, the fixing ring 260 bears in the axial direction 201 against the locking sleeve 230. The fixing ring 260 preferably prevents the shifting ring gear (320 in FIG. 3) from rotating when the shifting element 240 is arranged in the right-hand shifting position 205, wherein fixing or blocking of the shifting ring gear (320 in FIG. 3) is formed.

Furthermore, the transmission 120 is preferably assigned a disk-like plate 270, which, in the illustrated right-hand shifting position 205 of the shifting element 240, prevents a planet carrier (1521 in FIG. 16) assigned to the transmission 120 from moving into a further ring gear (1523 in FIG. 16). In this case, the disk-like plate 270 is supported preferably axially, or in the axial direction 203, i.e. along the axis of rotation 199, on the clutch housing 220. Furthermore, the disk-like plate 270 is arranged at an axial end, facing the tool receptacle 140, of the fixing ring 260. It should be noted that the disk-like plate 270 is referred to merely as "plate 270" in the following text for the sake of simplicity.

Preferably, the locking sleeve 230 exhibits a first material and the fixing ring 260 exhibits a second material that is different than the first material. Preferably, the first material is plastic and the second material is metal. As a result of the fixing ring 260 being configured with metal, wear during shifting operations with the shifting ring gear (320 in FIG. 3) can be reduced.

It should be noted that, in the present description, the term "axial" means an arrangement or orientation in the axial direction 201, i.e. along the axis of rotation 199. Likewise, in the present description, the term "radial" means an arrangement or orientation in a radial direction 203, i.e. perpendicular to the axis of rotation 199.

Figure 3:
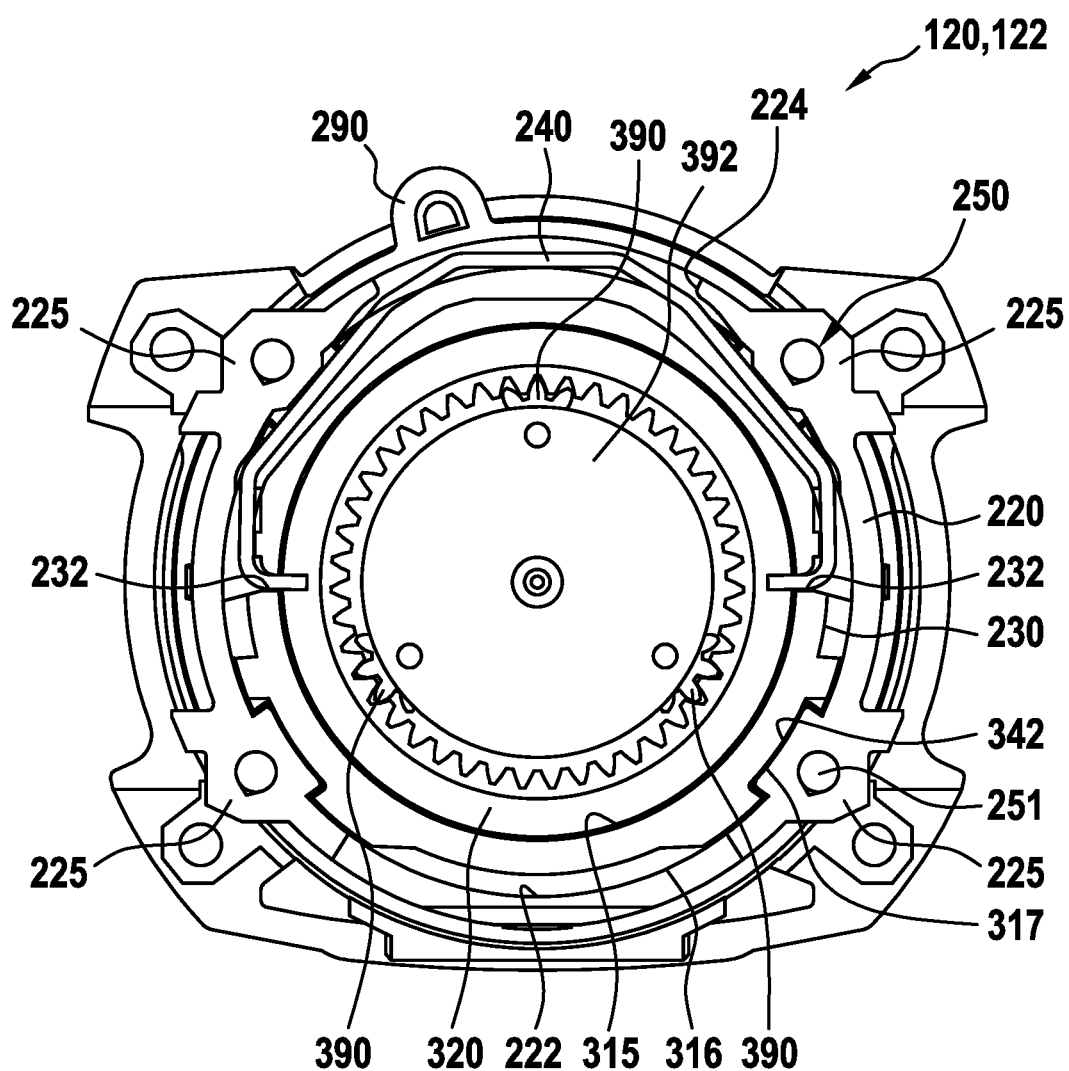
FIG. 3 shows a sectional view of the shiftable transmission from FIG. 1 and FIG. 2.

FIG. 3 shows the transmission housing 122 with the clutch housing 220 and the locking sleeve 230 from FIG. 2. As described above, the locking sleeve 230 is arranged on the inner circumference 222 of the clutch housing 220 and preferably fixed thereto.

Preferably, the transmission 120 has a shifting ring gear 320 that is axially displaceable by the shifting element 240. The shifting ring gear 320 is arranged in an inner receptacle 315 formed by the locking sleeve 230, wherein the shifting ring gear 320 preferably has, on its outer circumference (921 in FIG. 10), a receiving groove (920 in FIG. 10) for at least partially receiving the shifting element 240. Furthermore, FIG. 3 indicates a planet carrier 392 which is assigned to the shifting ring gear 320 and to which three planets 390 are assigned in the illustration.

Preferably, the clutch housing 220 has, on its inner circumference 222, at least one, in the illustration four inwardly directed, in particular radially inwardly directed, protrusions 342. In the context of the present disclosure, the expression "inwardly directed" means an orientation in the radial direction 203 from FIG. 2 toward the inside, or toward the axis of rotation 199. Preferably, the protrusions 342 are arranged with their longitudinal extent at least approximately parallel to the axis of rotation 199 from FIG. 1 and FIG. 2.

Analogously, the locking sleeve 230 has, on its outer circumference 316, at least one, in the illustration four receptacles 317. Preferably, the protrusions 342 are arranged in the associated receptacles 317 to form rotation prevention. In this case, the locking sleeve 230 is centered at its outer circumference, or via the receptacles 317, by the clutch housing 220 via the protrusions 342. According to one embodiment, the protrusions 342 are assigned to the connecting region 225 of the clutch housing 220, preferably formed in one piece with the connecting region 225.

Furthermore, FIG. 3 indicates the recesses 232, assigned to the locking sleeve 230, for the shifting element 240 to pass through. In the illustration, the locking sleeve 230 has two diametrically opposed recesses 232 for a respective end (1011, 1012 in FIG. 11) of the shifting element 240 to pass through. In this case, one end of the shifting element 240 is arranged preferably in a receptacle, in particular the receiving groove (920 in FIG. 10) of the shifting ring gear 320.

Moreover, FIG. 3 indicates the recess 224 formed in the clutch housing 220. In the illustration, the shifting element 240 projects through the recess 224 in an upper region of the clutch housing 220. Preferably, the clutch housing 220 is formed with the recess 224 such that the shifting element 240 is arranged at least partially, preferably entirely, within the transmission housing 122, in particular in the clutch housing 220. In other words, the shifting element 240 does not project beyond the clutch housing 220, preferably in the radial direction of the transmission housing 122. According to one embodiment, the shifting element 240 is arranged at least partially, preferably entirely, beneath the screw connection 250 from FIG. 2, or in the same plane.

Figure 4:
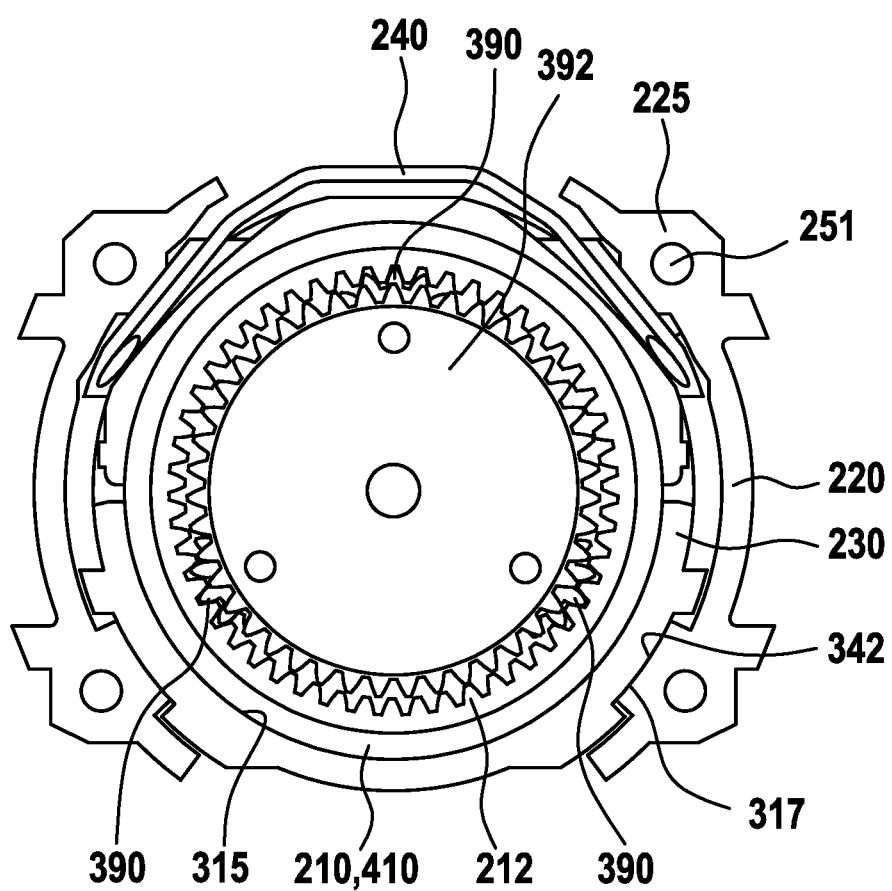
FIG. 4 shows a sectional view of the shiftable transmission from FIG. 1 and FIG. 2, in the region of a transmission cover assigned to the transmission.

FIG. 4 shows the clutch housing 220 and the locking sleeve 230 from FIG. 3, and the transmission cover 210 from FIG. 2. In this case, FIG. 4 indicates a centering collar 410, arranged in the inner receptacle 315 of the locking sleeve 230, of the transmission cover 210. The centering collar 410 is preferably formed in an annular manner, but can also be formed partially merely in the circumferential direction of the transmission cover 210, for example as a ring segment. The centering collar 410 is configured to center the locking sleeve 230 preferably in the radial direction 203 from FIG. 2.

Figure 5:
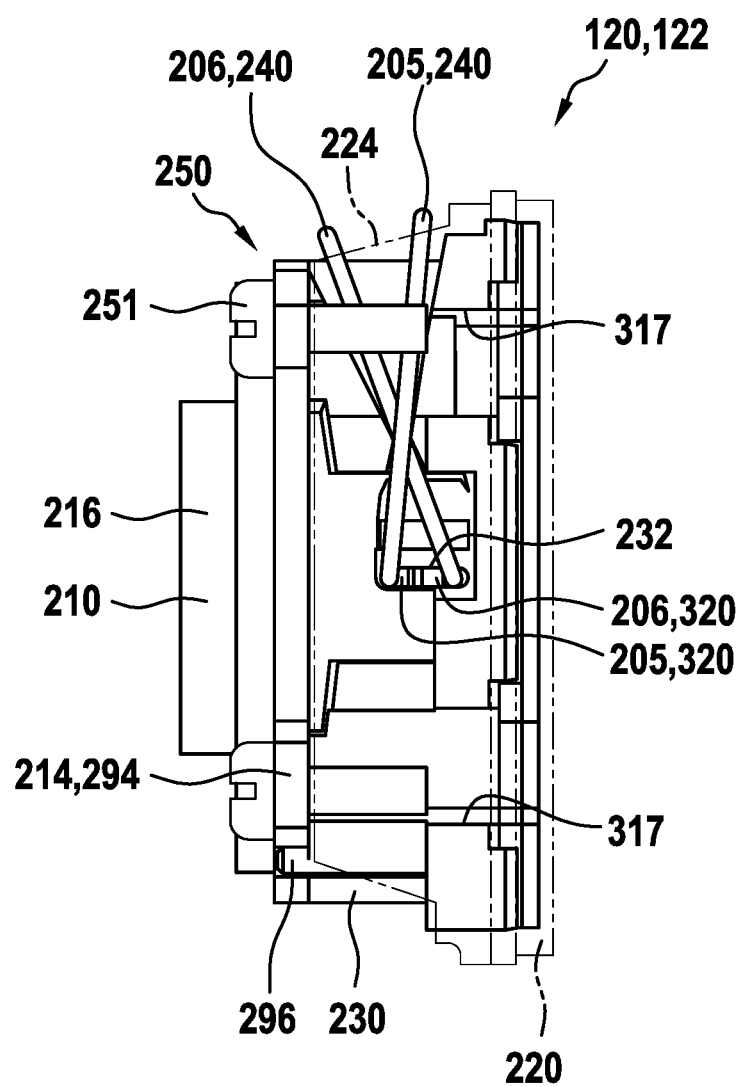
FIG. 5 shows a side view of the shiftable transmission from FIG. 1 to FIG. 3.

FIG. 5 shows the transmission housing 122 from FIG. 2 to FIG. 4, wherein, analogously to FIG. 2, the clutch housing 220 is illustrated in a transparent manner. In this case, FIG. 5 indicates the arrangement of the shifting element 240 in the illustrated right-hand shifting position 205 and in the illustrated left-hand shifting position 206. By way of example, the shifting element 240 is arranged in a manner facing the transmission cover 210 in the left-hand shifting position 206, and in the right-hand shifting position 205 the shifting element 240 is arranged in the recess 224 in a manner facing away from the transmission cover 210.

Figure 6:
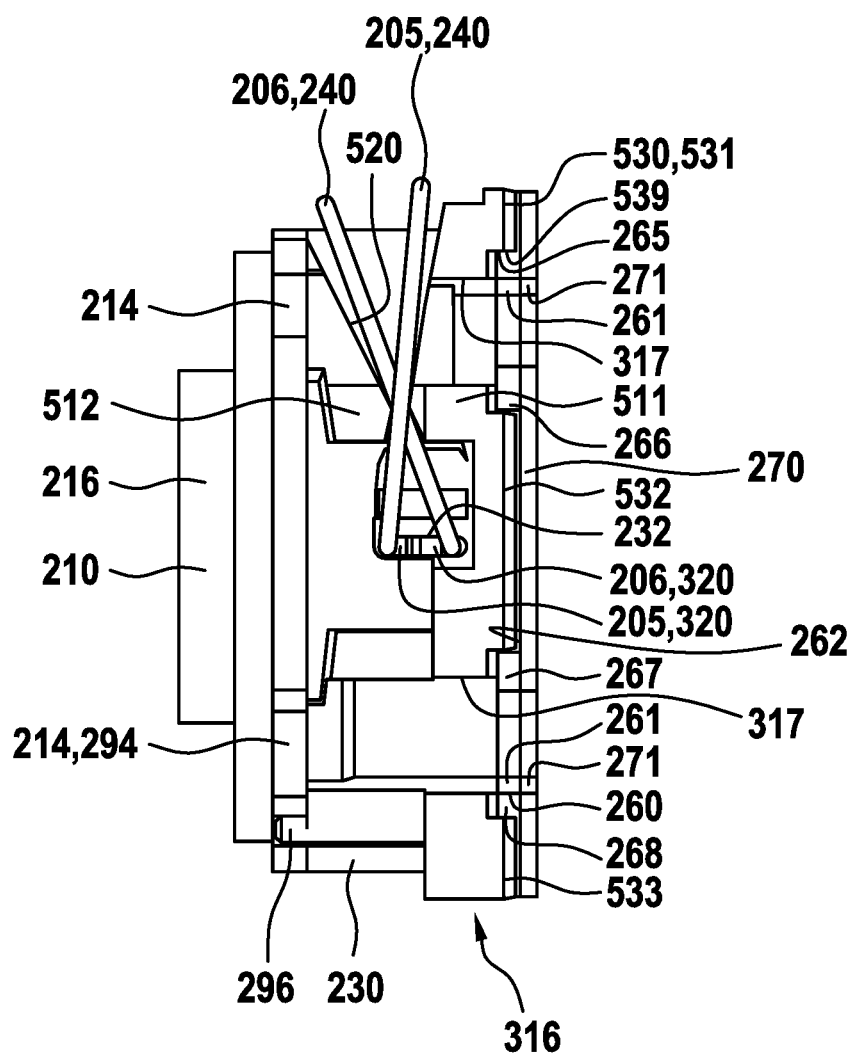
FIG. 6 shows a side view of the shiftable transmission from FIG. 4, without a locking sleeve assigned to the transmission housing.

FIG. 6 shows the transmission housing 122 from FIG. 4 without the clutch housing 220. In this case, FIG. 6 indicates the configuration of the outer circumference 316 of the locking sleeve 230. The locking sleeve 230 preferably has, on its outer circumference 316, deflecting webs 511, 512, formed in a diametrically opposite manner, for deflecting the shifting element 240 when shifting from one shifting position 205, 206 into the other. Preferably, the deflecting webs 511, 512 are formed by an indentation 520. Preferably, the shifting element 240 is arranged in the indentation 520. The deflecting webs 511, 512 preferably form end stops for the shifting element 240 in the shifting positions 205, 206.

According to one embodiment, the locking sleeve 230 has, at its axial end (802 in FIG. 9) facing the tool receptacle 140, a plurality of annular extensions 530. Preferably, the plurality of annular extensions 530 has four annular extensions 531, 532, 533, (534 in FIG. 12). Furthermore, the locking sleeve 230 preferably forms, on the inner circumference of the annular extensions 531, 532, 533, (534 in FIG. 12), a receptacle 539 for receiving the fixing ring 260 in the radial direction 203 in FIG. 2 (cf. FIG. 13). In this case, the fixing ring 260 is preferably arranged on the locking sleeve 230 in such a way that the annular extensions 531, 532, 533, (534 in FIG. 12) receive the fixing ring 260 circumferentially.

Furthermore, the plate 270 preferably has recesses 271 on its outer circumference. Moreover, the fixing ring preferably has tabs 265, 266, 267, 268 on its outer circumference, wherein a first or a second receptacle 261, 262 is formed in each case between two adjacent tabs 265, 266, 267, 268. The first and second receptacles 261, 262 are preferably configured to receive associated protrusions in the axial direction 201 in FIG. 2. The first receptacle 261 is preferably configured to receive protrusions (710, 720 in FIG. 8) of the clutch housing 220 and the second receptacle 262 is configured to receive the annular extensions 531, 532, 533, (534 in FIG. 12) of the locking sleeve 230. Preferably, the first receptacle 261 of the fixing ring 260 and the recess 271 in the plate 270 form, in the axial direction 201 in FIG. 2, a common receptacle for arranging the protrusions 342 from FIG. 3 of the clutch housing 220.

Figure 7:
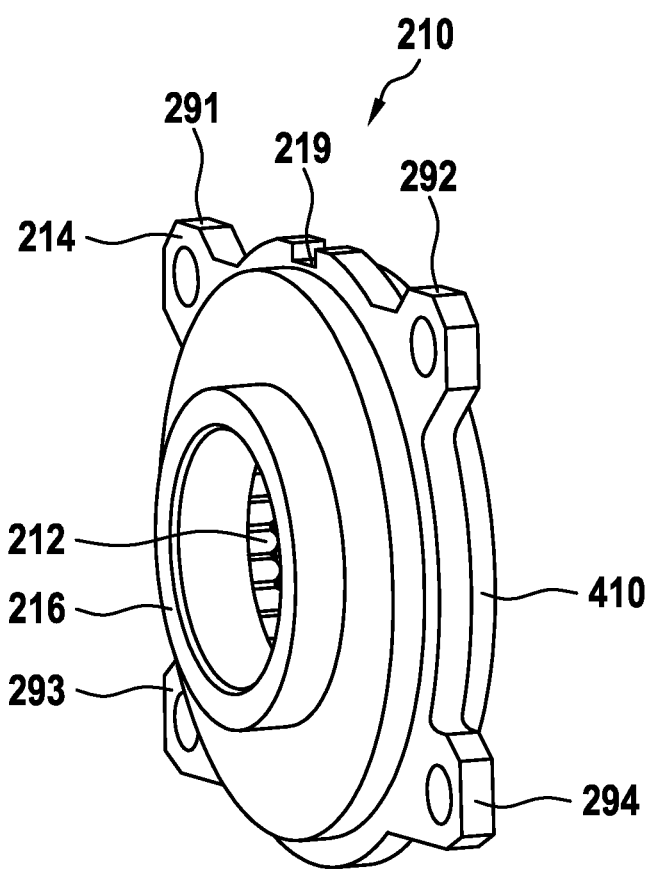
FIG. 7 shows a perspective view of a transmission cover assigned to the shiftable transmission from FIG. 1 to FIG. 6.

FIG. 7 shows the transmission cover 210 of the transmission housing 122 from FIG. 1 to FIG. 6. Here, FIG. 7 indicates the illustrated disk-like main body of the transmission cover 210 with the central bearing flange 216 and the connecting portions 214, arranged on the outer circumference, with the screw lugs 291 to 294. Furthermore, FIG. 7 shows the ring gear 212 formed opposite the bearing flange 216 on the transmission cover 210.

Furthermore, FIG. 7 indicates the receptacle 219 for receiving the at least one axially oriented positioning tab 239 from FIG. 2. The receptacle 219 is arranged, as illustrated in FIG. 7, at the top between the screw lugs 291 and 292. It should be noted that the receptacle 219 can also be arranged at any other desired point on the transmission cover 210, or between two adjacent screw lugs 291 to 294. In the illustration, the receptacle 219 is arranged centrally between the two screw lugs 291 and 292, but can also be arranged off-center or in an offset manner.

Furthermore, FIG. 7 indicates the preferably annular centering collars 410 from FIG. 4 that are able to be arranged in the inner receptacle 315 from FIG. 3 of the locking sleeve 230. The centering collar 410 preferably has a smaller outside diameter than the ring gear 212. Furthermore, the outside diameter of the centering collar 410 is preferably greater than the diameter of the central bearing flange 216.

Figure 8:
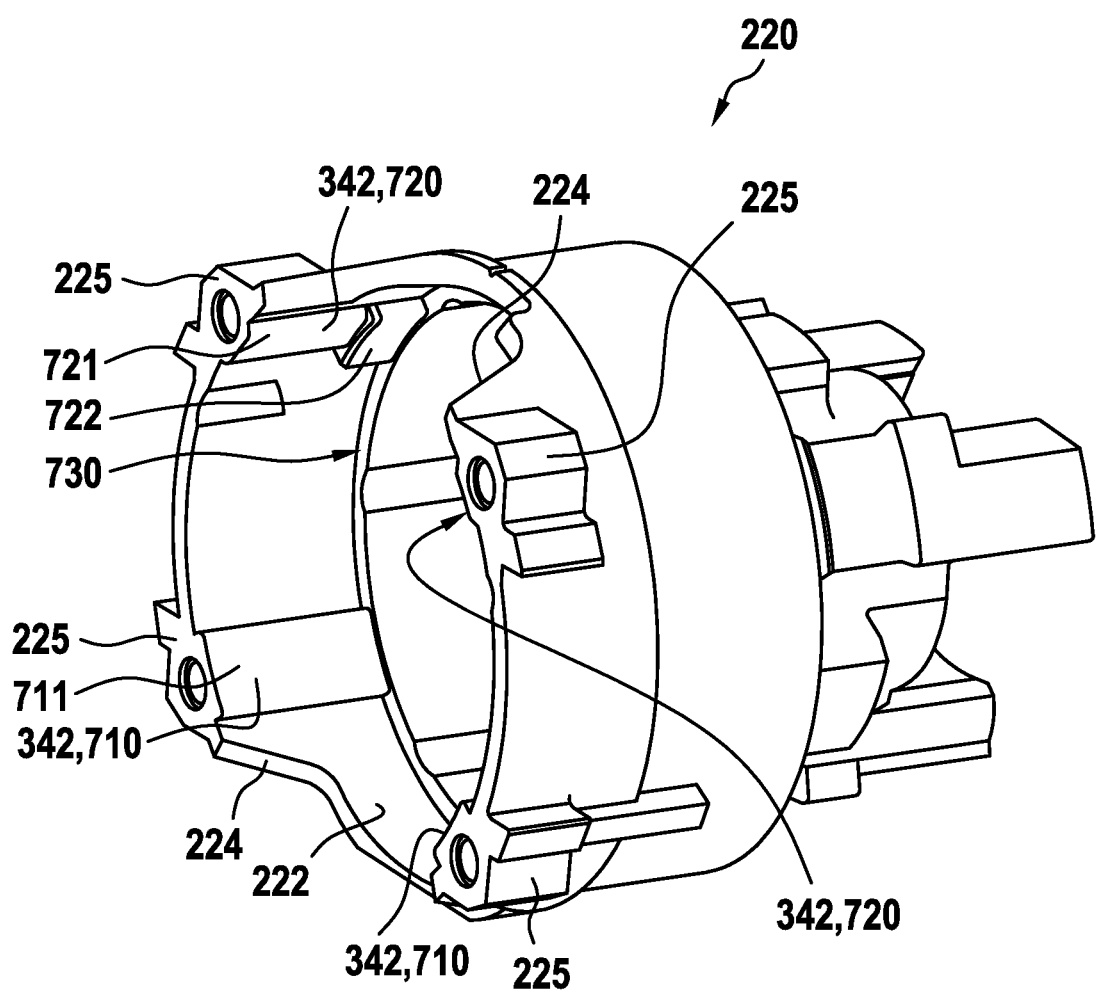
FIG. 8 shows a perspective view of a clutch housing assigned to the shiftable transmission from FIG. 1 to FIG. 6.

FIG. 8 shows the clutch housing 220 of the transmission housing 122 from FIG. 1 to FIG. 6. In this case, FIG. 8 indicates the preferably two opposite recesses 224. Furthermore, FIG. 8 shows the connecting regions 225 for partially arranging the screw element 251 from FIG. 2.

Preferably, the inwardly directed protrusions 342 (cf. also FIG. 3) are formed on the inner circumference 222 of the clutch housing 220. The protrusions 342 in this case form extensions formed in the radial direction 203 from FIG. 2. Preferably, the protrusions 342 are configured to prevent the locking sleeve 230 from FIG. 2 to FIG. 6 from rotating and/or for centering it on the clutch housing 220. According to one embodiment, the protrusions 342 are configured as one-step protrusions 710 with a single step 711 and/or as two-step protrusions 720 with a first step 721 and a second step 722. In this case, the second step 722 has a greater height in the radial direction 203 than the first step 721. Preferably, the protrusions 342 are formed in the connecting regions 225. In the illustration, four protrusions 342 are formed, wherein preferably the one-step protrusions 710 are formed in the lower connecting regions 225 in the illustration and the two-step protrusions 720 are formed in the upper connecting regions 225 in the illustration.

Preferably, in the assembled state of the transmission 120, the protrusions 710, 720 are received in the receptacles 271 of the plate 270 and the first receptacles 261 of the fixing ring 260. In particular, the protrusions 710, 720 are each received in the first receptacles 261 of the fixing ring 260.

Furthermore, the clutch housing 220 preferably has on its inner circumference, at least partially in the circumferential direction, a contact edge 730 for supporting the plate 270. The contact edge 730 preferably forms a radially inwardly directed extension.

Figure 9:
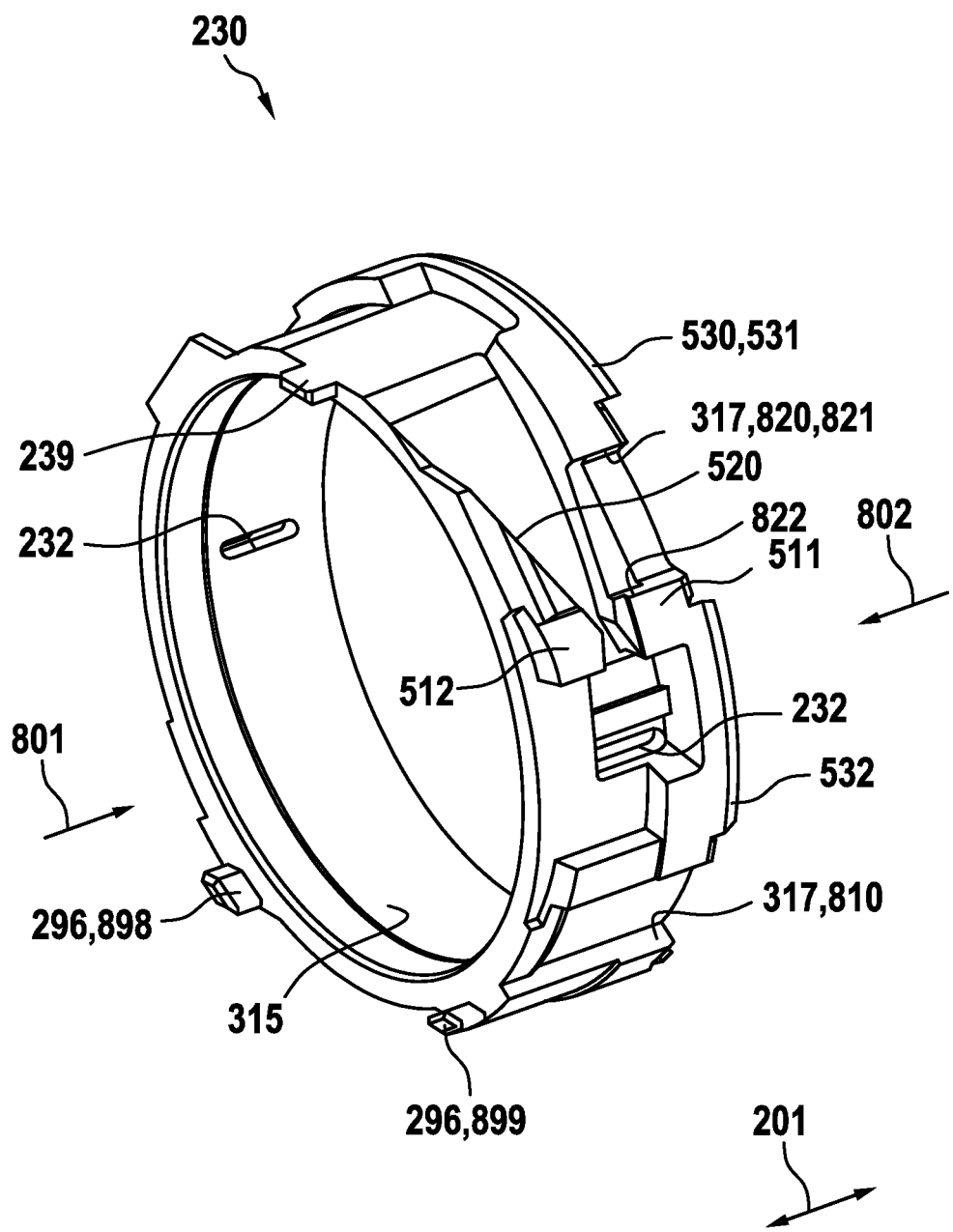
FIG. 9 shows a perspective view of a locking sleeve assigned to the shiftable transmission from FIG. 1 to FIG. 6.

FIG. 9 shows the locking sleeve 230 from FIG. 1 to FIG. 6 with its axial ends 801, 802 as seen from the first axial end 801. Here, FIG. 9 indicates the preferably cylindrical or annular main body of the locking sleeve 230 with its two diametrically opposite recesses 232 for the shifting element 240 to pass through. Furthermore, FIG. 9 indicates the illustrated V-shaped indentation 520 and the deflecting webs 511, 512, formed opposite one another, for deflecting the shifting element 240. The deflecting webs 511, 512 in this case have preferably an at least approximately triangular deflecting contour. As illustrated, the locking sleeve 230 has two deflecting contours, formed diametrically opposite one another, each having an indentation 520 and two deflecting webs 511, 512.

Furthermore, FIG. 9 illustrates the positioning tab 239, arranged at the axial end 801 facing the transmission cover 210, and the supporting pegs 296 and 898, 899. The supporting pegs 898, 899 are preferably formed in a diamond shape but can also have any other desired shape, for example a triangular shape. Likewise, FIG. 9 indicates the preferably triangular arrangement of the positioning tab 239 and of the supporting pegs 898, 899. It should be noted that the arrangement can also have any other desired shape, for example a square shape.

According to one embodiment, the locking sleeve 230 has receptacles 317 and 810, 820, assigned to the protrusions 710, 720 in FIG. 8, for preventing the locking sleeve 230 from rotating and centering it on the clutch housing 220. The receptacles 810, 820 are formed preferably in the axial direction 201. Preferably, the receptacles 801 are arranged at the bottom in the illustration, or in the region of the supporting elements 898, 899, and the receptacles 820 are arranged at the top in the illustration, or in the region of the deflecting webs 511, 512. In particular the receptacle 820 is formed above the deflecting webs 511, 512.

Preferably, a recess 232 is arranged between the receptacles 810, 820. Preferably, the receptacle 820 has a first and a second portion 821, 822 in the axial direction 201. In this case, the first portion 821 is configured to receive the second step 722 of the clutch housing 220 from FIG. 8 and the second portion 822 is configured to receive the first step 721 of the clutch housing 220 from FIG. 8.

Furthermore, FIG. 9 indicates the plurality of annular extensions 530 formed at the second axial end 802. Preferably, a receptacle 810, 820 is formed in each case between two adjacent annular extensions 531, 532, 533, (534 in FIG. 12).

Figure 10:
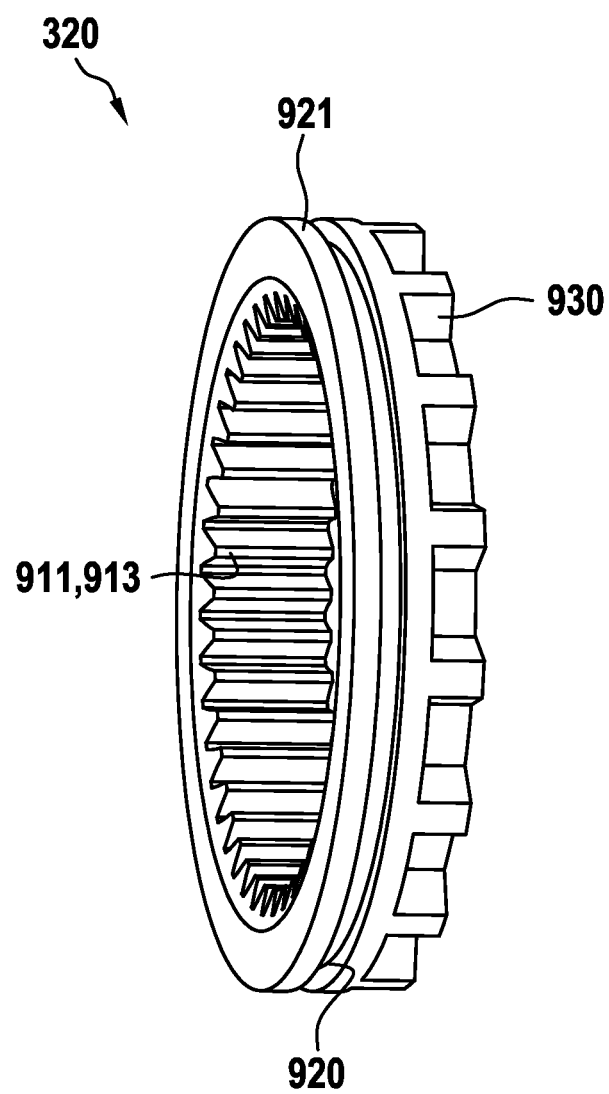
FIG. 10 shows a perspective view of a shifting ring gear assigned to the shiftable transmission from FIG. 1 to FIG. 6.

FIG. 10 shows the shifting ring gear 320 of the transmission 120 from FIG. 1 to FIG. 6. The shifting ring gear 320 has, in the illustration, an annular main body which has, on its outer circumference 921, a receiving groove 920 for partially receiving the shifting element 240 from FIG. 2 to FIG. 6.

Furthermore, the shifting ring gear 320 has, on its outer circumference 921, by way of example, a further toothing 930. In this case, the toothing 930 is preferably formed as rotation prevention for the shifting ring gear 320. Furthermore, the shifting ring gear 320 has on its inner circumference 911 a toothing 913, along which the planets 390 of the planet carrier 392 from FIG. 3 and FIG. 4 roll.

FIG. 11 shows the shifting element 240 of the transmission 120 from FIG. 1 to FIG. 6. The shifting element 240 has, in the illustration, an arcuate, preferably at least approximately U-shaped main body 1010. The main body 1010 has preferably two ends 1011, 1012, which are directed inwardly. Preferably, the ends 1011, 1012 are arranged in the receiving groove 920 of the shifting ring gear 320 from FIG. 10 in the assembled state of the transmission 120.

Figure 12:
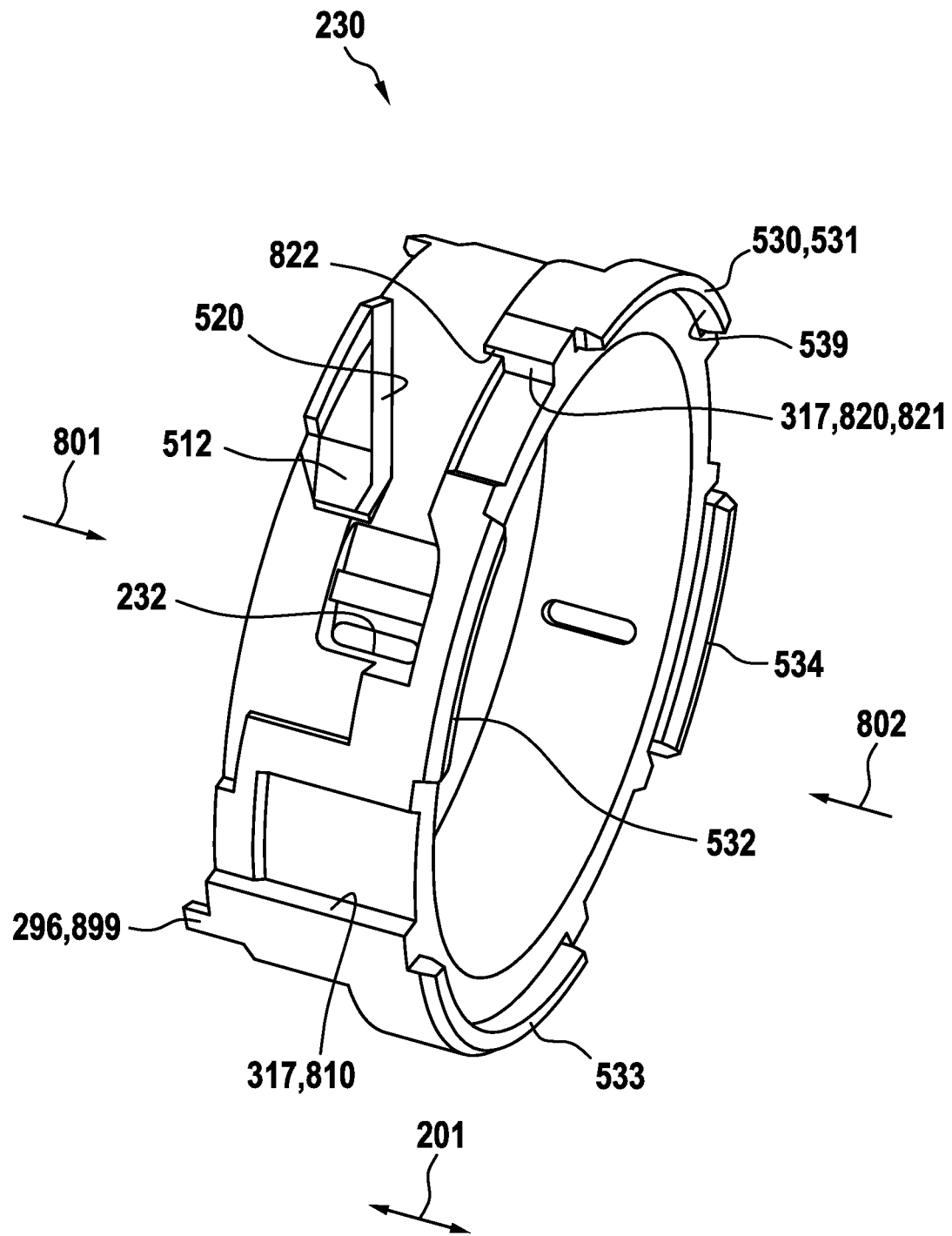
FIG. 12 shows a perspective side view of the locking sleeve from FIG. 9.

FIG. 12 shows the locking sleeve 230 from FIG. 9 as seen from the second axial end 802. In this case, FIG. 12 indicates the plurality of annular extensions 530 arranged at the second axial end 802. In the illustration, four annular extensions 531-534 are shown, but more or fewer than four annular extensions 531-534 may also be present. In particular the annular extensions 532, 534 are preferably each arranged in the region of the recess 232.

Furthermore, FIG. 12 indicates the receptacle 539 for receiving the fixing ring 260 in the radial direction 203 from FIG. 2. Furthermore, FIG. 12 illustrates the receptacles 810, 820, in particular the receptacle 820 with its first and second portion 821, 822.

Figure 13:
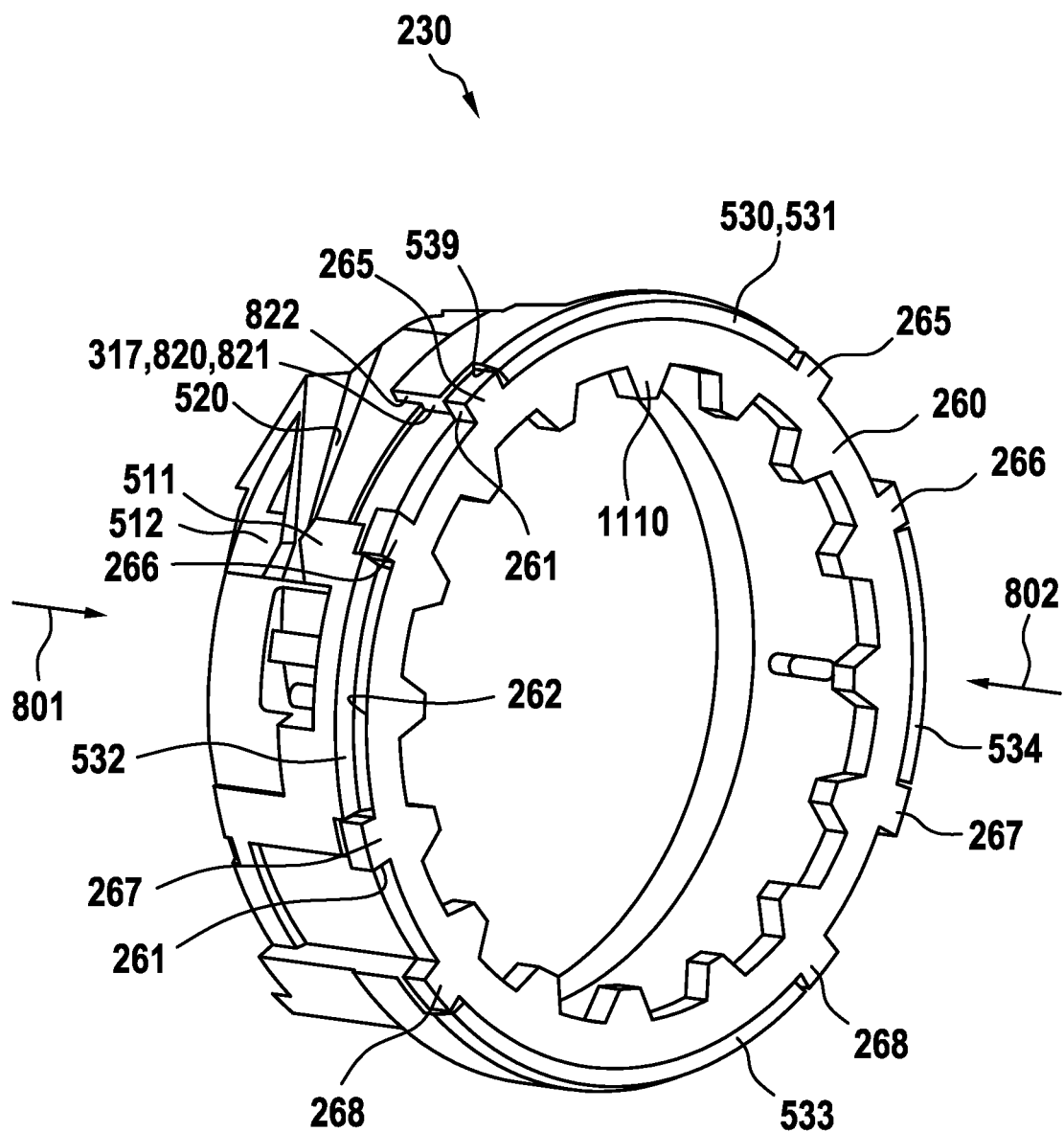
FIG. 13 shows a perspective view of the locking sleeve from FIG. 12, with an associated fixing ring.

FIG. 13 shows the locking sleeve 230 from FIG. 12 with the fixing ring 260 from FIG. 2, FIG. 5 and FIG. 6. The fixing ring 260 has, as described above, the tabs 265, 266, 267, 268 on its outer circumference and an internal toothing 1110 on its inner circumference. The external toothing 930 of the shifting ring gear 320 from FIG. 10 preferably forms a form fit with the internal toothing 1110 of the fixing ring 260.

In the illustration, the fixing ring 260 is arranged in the receptacle 539. In this case, the fixing ring 260 preferably does not project beyond the locking sleeve 230 in the axial direction 201 from FIG. 2. The fixing ring 260 is constructed in a mirror-symmetric manner and has, on its illustrated right-hand and left-hand circumferential halves, in each case the tabs 265-268.

The annular extension 531 is preferably arranged between the two tabs 265, the annular extension 533 is preferably arranged between the two tabs 268, and between the tabs 266, 267, the annular extension 532 is arranged on the left in the illustration and the annular extension 534 is arranged on the right in the illustration. The annular extensions 531-534 are preferably each arranged in receptacles 262 of the fixing ring 260. Furthermore, the receptacles 261 for arranging the protrusions 710, 720 of the clutch housing 220 from FIG. 8 are preferably each formed between the tabs 265, 266 and 267, 268.

Figure 14:
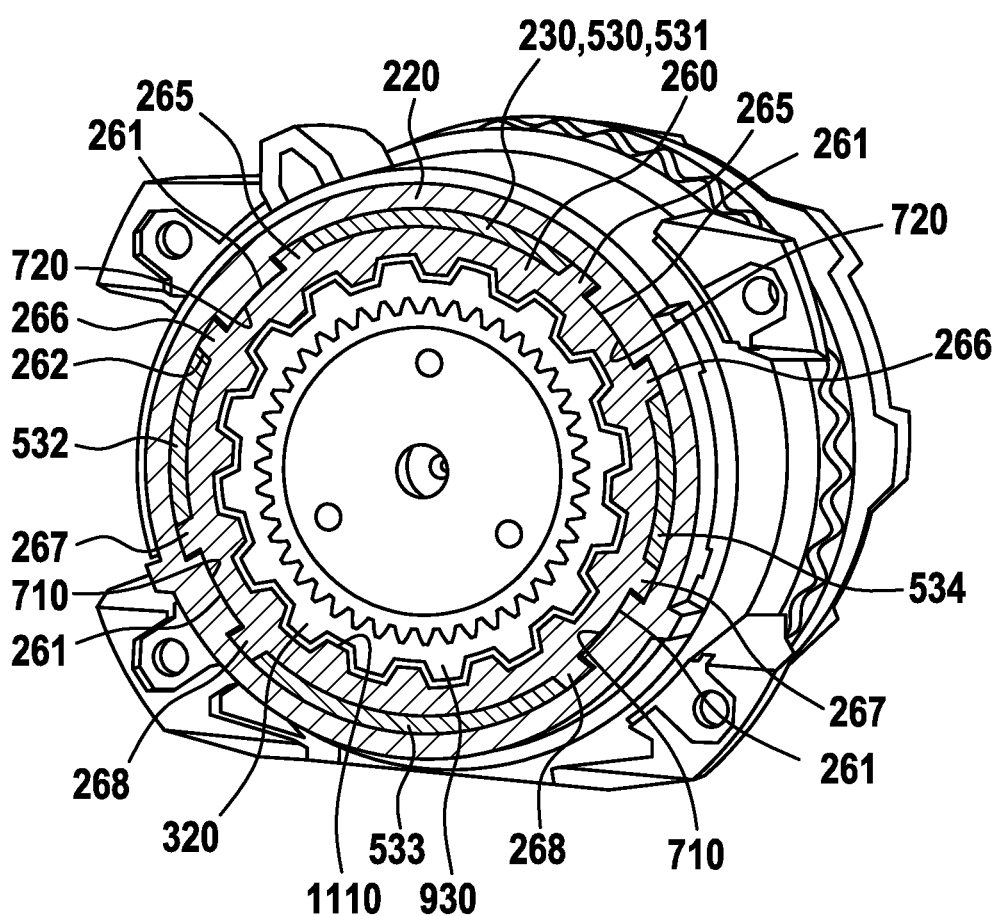
FIG. 14 shows a sectional view of the shiftable transmission from FIG. 1 to FIG. 6, for clarifying the arrangement of the fixing ring from FIG. 13.

FIG. 14 shows the arrangement of the fixing ring 260 in the transmission 120 from FIG. 2. In this case, the protrusions 710, 720 of the clutch housing 220 are received in the first receptacles 261 of the fixing ring 260 and the annular extensions 531-534 of the clutch housing 220 are arranged in the second receptacles 262 of the fixing ring 260. As a result, rotation prevention and/or torque support can be allowed. Furthermore, FIG. 14 indicates the external toothing 930 of the shifting ring gear 320, which forms a form fit with the internal toothing 1110 of the fixing ring 260.

Figure 15:
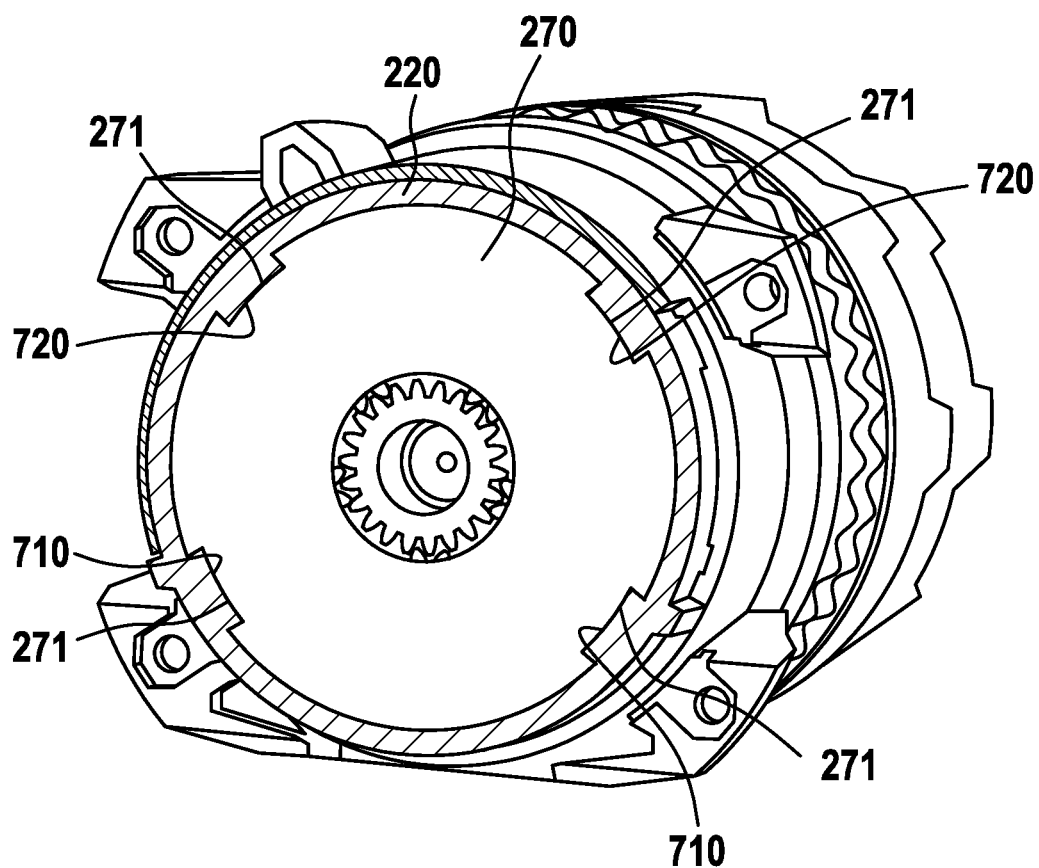
FIG. 15 shows a sectional view of the shiftable transmission from FIG. 1 to FIG. 6, for clarifying the arrangement of a plate assigned to the locking sleeve.

FIG. 15 shows the arrangement of the plate 270 from FIG. 2 in the clutch housing 220. In this case, preferably the protrusions 710, 720 of the clutch housing 220 are received in the recesses 271 of the plate 270 for rotation prevention. The plate 270 is preferably formed in particular to prevent lubricant escaping between the gears of the transmission 120.

FIG. 16 shows the transmission 120 from FIG. 2, arranged in the transmission housing 122. In this case, FIG. 16 indicates a cross-sectional plane 1500, arranged perpendicularly to the axis of rotation 199, at least in the first, or right-hand shifting position 205. In the illustration, the cross-sectional plane 1500 is arranged in the axial direction 201 at the height of the ring gear 212 of the transmission cover 210. In the cross-sectional plane 1500, the locking sleeve 230 is preferably arranged at least regionally between the transmission cover 210 and the shifting element 240. Furthermore, in the cross-sectional plane 1500, the shifting element 240 is preferably arranged at least regionally between the locking sleeve 230 and the clutch housing 220. Put another way, at least in the cross-sectional plane 1500, starting from the axis of rotation 199 radially toward the outside, the transmission cover 210 is arranged first, then the locking sleeve 230 and subsequently the clutch housing 220, wherein the shifting element 240 is preferably arranged between the locking sleeve 230 and the clutch housing 220.

Furthermore, FIG. 16 indicates the centering of the locking sleeve 230 by the centering collar 410 of the transmission cover 210. In this case, the centering collar 410 is arranged in the inner receptacle 315 of the locking sleeve 230. Furthermore, FIG. 16 indicates the arrangement of the fixing ring 260 in the receptacle 539 of the locking sleeve 230, wherein the fixing ring 260 is arranged on the locking sleeve 230 in such a way that the annular extensions 531-534 receive the fixing ring 260 circumferentially.

Likewise, FIG. 16 shows the arrangement of the plate 270 on the clutch housing 220. In this case, the plate 270 is arranged at the axial end, facing the tool receptacle 140, of the fixing ring 260. In particular, the plate 270 bears against the axial end 802, facing the tool receptacle 140, of the clutch housing 220. In this case, the plate 270 is supported in the direction of the tool receptacle 140 on the contact edge 730 of the clutch housing 220.

According to one embodiment, the transmission 120 is configured in the manner of a planetary transmission and has at least one ring gear 1523, at least one planet carrier 1521 and at least one planet gear 1522. In the illustration, the plate 270 is arranged between the at least one planet carrier 1521 and the at least one planet gear 1522. In this case, the plate 270 prevents the planet carrier 1521 from moving or being displaced into the ring gear 1523 in the first shifting position 205 of the shifting element 240.

Preferably, at least two different gears 1598, 1599 are assigned to the shifting element 240, wherein the shifting element 240 is arranged in the right-hand and left-hand shifting positions 205, 206 from FIG. 2 that are assigned to the respective gears 1598, 1599. In the right-hand shifting position 205 of the shifting element 240, the shifting ring gear 320 is arranged in an illustrated left-hand position, or in a first gear 1598, and in the left-hand shifting position 206 of the shifting element 240, the shifting ring gear 320 is arranged in an illustrated right-hand position, or in a further gear 1599.

Furthermore, FIG. 16 indicates the protective sleeve 196, which is assigned to the tool receptacle 140. Furthermore, FIG. 16 shows an example of the structure of the torque setting device with a torque setting sleeve 197.

The invention claimed is:

1. A portable power tool comprising:
a tool receptacle; and
a drive unit configured to rotationally drive the tool receptacle about an associated axis of rotation, the drive unit having at least one drive motor and a shiftable transmission arranged in a transmission housing, the shiftable transmission comprising:
an at least partially sleeve-like clutch housing;
a transmission cover fastened to the clutch housing;
a shifting element configured to shift the shiftable transmission between at least two different gears;
a locking sleeve, which is configured to lock the shifting element in at least a first shifting position and a second shifting position, arranged in the clutch housing,
wherein, at least in the first shifting position of the shifting element, the shiftable transmission forms a cross-sectional plane perpendicular to the axis of rotation in which the locking sleeve is arranged at least regionally between the transmission cover and the shifting element and the shifting element is arranged at least regionally between the locking sleeve and the clutch housing.

2. The portable power tool according to claim 1, wherein the shiftable transmission further comprises:
a shifting ring gear that is displaceable axially by the shifting element and is arranged in an inner receptacle formed by the locking sleeve,
wherein an outer circumference of the shifting ring gear has a receiving groove for at least partially receiving the shifting element.

3. The portable power tool according to claim 2, wherein the transmission cover has an annular centering collar arranged in the inner receptacle of the locking sleeve, the transmission cover configured to center the locking sleeve in a radial direction.

4. The portable power tool according to claim 1, wherein the transmission cover engages in a form-fitting manner in the locking sleeve.

5. The portable power tool according to claim 4, wherein:
the locking sleeve has a first axial end facing the transmission cover and, at the first axial end, the locking sleeve includes at least one axially oriented positioning tab, and
the transmission cover has a receptacle configured to receive the at least one axially oriented positioning tab.

6. The portable power tool according to claim 1, wherein the locking sleeve has a first axial end facing the transmission cover and, at the first axial end, the locking sleeve includes at least one supporting peg that is supported on a screw lug of the transmission cover.

7. The portable power tool according to claim 5, wherein:
the locking sleeve has at least two supporting pegs arranged at the first axial end, and
the at least one positioning tab and the at least two supporting pegs form a triangular arrangement.

8. The portable power tool according to claim 1, wherein, at a side of the transmission cover facing the tool receptacle, the transmission cover forms a ring gear of the shiftable transmission.

9. The portable power tool according to claim 1, wherein:
the clutch housing has at least one inwardly directed protrusion arranged on an inner circumference of the clutch housing,
the locking sleeve has at least one receptacle on an outer circumference of the locking sleeve, and
the at least one protrusion is arranged in the at least one receptacle.

10. The portable power tool according to claim 9, wherein the at least one protrusion is arranged parallel to the axis of rotation.

11. The portable power tool according to claim 9, wherein the at least one protrusion includes a plurality of protrusions, each of which is configured as a one-step protrusion with a single step and/or as a two-step protrusion with a first step and a second step that has a greater height in a radial direction than the first step.

12. The portable power tool according to claim 11, wherein the locking sleeve has a plurality of receptacles, each of which is assigned to one of the plurality of protrusions so as to prevent the locking sleeve from rotating and centering the locking sleeve on the clutch housing.

13. The portable power tool according to claim 1, wherein a fixing ring is arranged at a first axial end of the locking sleeve that faces the tool receptacle, and the fixing ring prevents the shifting ring gear from rotating when the shifting element is arranged in the first shifting position.

14. The portable power tool according to claim 13, wherein the locking sleeve has annular extensions, and the fixing ring is arranged on the locking sleeve such that the annular extensions circumferentially receive the fixing ring.

15. The portable power tool according to claim 1, wherein the clutch housing includes a recess formed along the axis of rotation of the tool receptacle and via which the shifting element is connected to an operator-control element for actuating the shifting element.

16. A portable power tool comprising:
a tool receptacle; and
a drive unit configured to rotationally drive the tool receptacle about an associated axis of rotation, the drive unit having at least one drive motor and a shiftable transmission arranged in a transmission housing, the shiftable transmission comprising:
an at least partially sleeve-like clutch housing;
a transmission cover fastened to the clutch housing;
a shifting element configured to shift the shiftable transmission between at least two different gears;
a locking sleeve, which is configured to lock the shifting element in at least a first shifting position and a second shifting position, arranged in the clutch housing,
wherein, at least in the first shifting position of the shifting element, the shiftable transmission forms a cross-sectional plane perpendicular to the axis of rotation in which the locking sleeve is arranged radially at least partially between the transmission cover and the shifting element and the shifting element is arranged at least partially between the locking sleeve and the clutch housing.

* * * * *